United States Patent [19]

Tarlano

[11] Patent Number: 4,949,618
[45] Date of Patent: Aug. 21, 1990

[54] MISSILE PROTECTION SYSTEM

[75] Inventor: John P. Tarlano, Fairfax County, Va.

[73] Assignee: The United States of America, Washington, D.C.

[21] Appl. No.: 456,829

[22] Filed: Dec. 19, 1989

[51] Int. Cl.⁵ .............................................. F41F 3/04
[52] U.S. Cl. .................................................. 89/1.809
[58] Field of Search ................ 89/1.809, 1.810, 1.818, 89/1.817

[56] References Cited

U.S. PATENT DOCUMENTS

| | | | |
|---|---|---|---|
| 3,072,022 | 1/1963 | Wood et al. | 89/1.810 |
| 3,087,386 | 4/1963 | Rung et al. | 89/1.810 |
| 3,088,377 | 5/1963 | Siegel | 89/1.810 |
| 3,137,703 | 6/1964 | Brown | 89/1.810 |
| 3,166,977 | 1/1965 | Pickett et al. | 89/1.809 |
| 3,166,979 | 1/1965 | Draim | 89/1.809 |
| 3,242,810 | 3/1966 | LaPointe | 89/1.810 |
| 3,279,319 | 10/1966 | Semonian et al. | 89/1.810 |
| 3,301,132 | 1/1967 | Lehmann et al. | 89/1.810 |
| 3,499,364 | 3/1970 | D'Ooge | 89/1.810 |
| 3,811,360 | 5/1974 | Ricks | 89/1.817 |

Primary Examiner—David H. Brown

[57] ABSTRACT

A missile protection system having a meltable cover attached to a missile, the meltable cover being over the nozzle system of the missile. The missile protection system protects the nozzle system of the missile from effects of turbulent water. Such protection is available prior to ignition of a first stage motor of the missile. The meltable cover melts away from the missile, by heat produced due to ignition of the first stage motor.

3 Claims, 2 Drawing Sheets

MISSILE PROTECTION SYSTEM

FIELD OF THE INVENTION

The present invention relates to a continous cover means for protecting a nozzle system of a missile from energy of turbulent water. The continous cover means can be designed to prevent turbulent water from damaging the nozzle system. The turbulent water is created during an underwater launch of the missile.

BACKGROUND OF THE INVENTION

During an underwater launch of a D-5 missile or missile of equivalent or greater weight, the missile creates turbulence and backwash in water through which it passes. This turbulent water will impinge upon a rocket nozzle system. The rocket nozzle system is connected to a rocket motor of the missile. The energy in the turbulent water will put the nozzle system under significant stress. The nozzle system comprises a nozzle and its associated nozzle moving mechanisms and nozzle flexing mechanisms. Such energy of the turbulent water can break or severely damage a nozzle system, absent the disclosed invention.

Elements have been proposed to protect the interior of a nozzle from the effects of energy in turbulent water. However means has not been previously proposed to protect both the interior region and the exterior region of a nozzle, that is a nozzle system, from energy of turbulent water.

The present invention relates to means to protect the interior region and the exterior region of a nozzle of a heavy missile from energy of turbulent water, during underwater launch of the missile. A cover may be used. The cover should be of a sufficient thickness so as not to be broken by energy of turbulent waters created during underwater launch of the missile. However the cover shouild be sufficiently light weight so that after the missile exits the water, the cover can quickly be ejected, to expose the nozzle and not interfere with its ability to accurately propel the missile.

A meltable cover may be used. A melting away of the meltable cover may be performed by hot gases coming from a rocket motor to which the nozzle is connected. The hot gases pass through the nozzle and on to the meltable cover, to melt it. This melting away is accomplished by making the cover of a sufficient thinness so that after only a brief time the gases being emitted from the nozzle will allow a melting of the cover and will allow the missile to be accurately propelled. Meltable material for the cover could be a plastic material. The cover would have a thickness which would be sufficiently strong to protect the missile during underwater launch and yet thin enough to allow missile gases to quickly melt the cover and begin to propel the missile after the cover is melted.

A metal cover may alternately be used. The cover may be ejected from the missile by means of hot gases from the rocket motor. Alternately, the cover may be ejected by an ejection means. One such ejection means is explosive bolts. Explosive bolts can be used to eject the cover from other means that hold the cover onto the missile.

SUMMARY OF THE INVENTION

An underwater launched missile protection system, comprising a missile having a nozzle system in the aft end of the missile and means for protecting the nozzle system from energy of turbulent water, the turbulent water being created during underwater launch of the missile.

DESCRIPTION OF THE PREFERRED EMBODIMENTS

Figure 1:
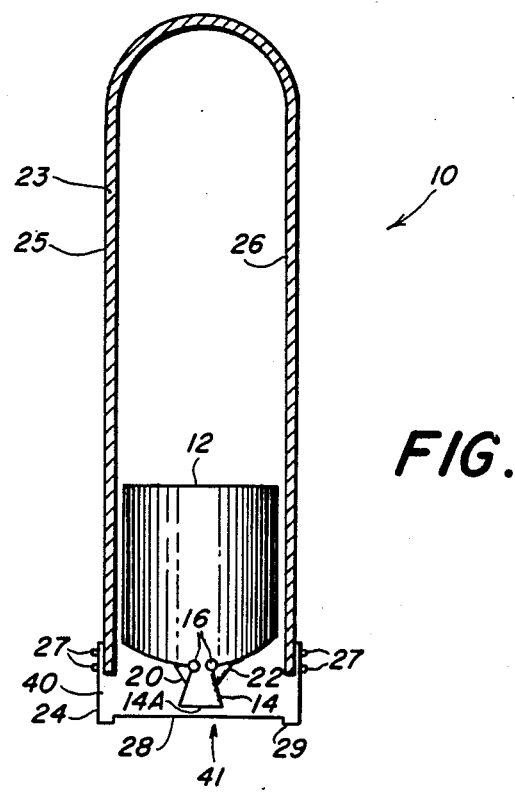
FIG. 1 is a sectional view of a missile that has an external extender, to which a one piece cover is affixed over back end of the missile, thus protecting the nozzle system.

FIG. 1 shows a missile 10. Within the missile 10 is a first stage rocket motor 12. Attached to the motor 12 is a nozzle 14, in the aft end of missile 10. The nozzle 14 is used to guide gases emitted from rocket motor 12, during a burning of the motor 12. The nozzle 14 is attached to the motor 12 by a seal 16, to allow the nozzle 14 to flex with respect to a longitudinal axis of the motor 12. The missile 10 also has actuators 20 and 22 to move the nozzle 14 relative to the longitudinal axis of the motor 12 and missile 10. The nozzle system comprises the nozzle 14 and associated means for operating the nozzle.

The shell 23 of the missile 10 can be extended by an extender cylinder 24. The extender 24 can be placed on the outer surface 25 of shell 23. An extender can alternately can be placed on the inner surface 26 of the shell 23. The extender 24 extends shell 23. Shell 23 normally terminates above the lower end 14A of nozzle 14. The extender 24 extends shell 23 to a region below the end 14A of nozzle 14.

Figure 1A:
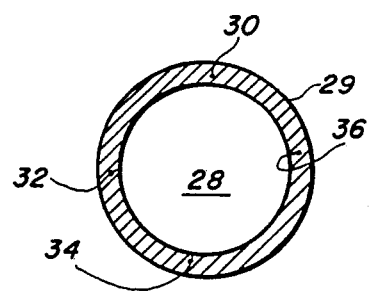
FIG. 1A is a sectional view of a lock ring for holding a cover of FIG. 1 onto an external extender.

A continuous cover 28 is affixed to the missile. The cover 28 may be connected to an extender 24 by use of a lock ring 29. Lock ring 29 may be a separate unit or an integral part of extender 24. Lock ring 29 may have screw holes in it. The cover 28 may be connected to lock ring 29 by means of screws. Such screws are shown in FIG. 1A. Screws 30, 32, 34 and 36, as well as cover 28 and lock ring 29, are shown connected together.

In the embodiment of FIG. 1 the outer surface of the missile may be is extended to a region below the nozzle 14 of the nozzle system. In this way the cover 28 need not come in contact with the nozzle 14. The placement of cover 28 will allow nozzle 14 to move, and pivot, during exit of the missile 10 from water.

During a launch of the missile through the water, the missile protection system protects the nozzle compartment 40 from energy of turbulent water. The missile is launched through the water by gases from a gas generator (not shown). Energy of turbulent waters, created by the weight and movement of the missile through the water, are not able to damage the nozzle 14, the flexible seal 16 or the actuators 20 and 22.

The continuous cover 28 may be made of a meltable material such as a plastic material. That is, the cover 28 should be made from a material that will melt relatively easily by hot gases coming out of the nozzle 14, after the first stage motor 12 is ignited. Cover 28 should be made of a material and have such a thickness that it is sufficiently strong so that it will not break under the stresses placed on it by energy of turbulent waters, yet sufficiently thin in order to melt or otherwise be blown off.

The continuous cover 28 could alternately be made of metal. Means could be used to eject the cover 28 from the missile 10. Such ejection could occur after the missile 10 is clear of the water. One such means for ejecting the cover 28 are explosive bolts (not shown) attached between the missile 10 and the cover 28.

If a metal cover 28 is used, the missile 10 could be made to sense that missile 10 has left the water. The missile 10 could be made to activate explosive bolts, just after the missile 10 clears the water. This event of clearance of the missile 10 from the water could be the critical event after which the explosive bolts, or other quick release mechanism, could be activated.

Alternatively, a time delay system could be used to cause the missile 10 to activate the explosive bolts. The activation of the explosive bolts would cause the cover 28 to be ejected from the missile 10. The period of the time delay to be used by the time delay system could be determined to be of a sufficient length such that the missile 10 would have just exited the water. The expiration of the time delay period would be the critical event at which time the explosive bolts would be activated.

If a meltable cover 28 is used the the following mode of ejection could be used. After the missile exits the water the first stage motor is fired and hot gases come out of nozzle 14. These hot gases will, within a small period of time, blow off the meltable cover 28 or within a small period of time, melt the meltable cover 28. The meltable cover 28 would have a sufficient thinness, so as to quickly melt. Cover 28 could be made of a plastic material which would quickly breakup, or breakup and melt, or merely melt. The cover 28 could be made of a plastic material. The cover could be scored in such a way so as to very quickly break up. After the hot gases have removed the cover 28 from the missile, the gases will exit out of the end 41 of the missile 10. The hot gases will allow the missile 10 to fly upward from the surface of the water. The thickness of the cover 28 will depend on the melting characteristics or breakup and melting characteristics of the material from which the meltable cover 28 is made.

The combination of missile 10 and cover 28 form a missile protection system, to protect the exterior region of the nozzle from energy of turbulent water, the turbulent water being created during underwater launch of the missile. A nozzle system is in the exterior region of the nozzle.

Figure 2:
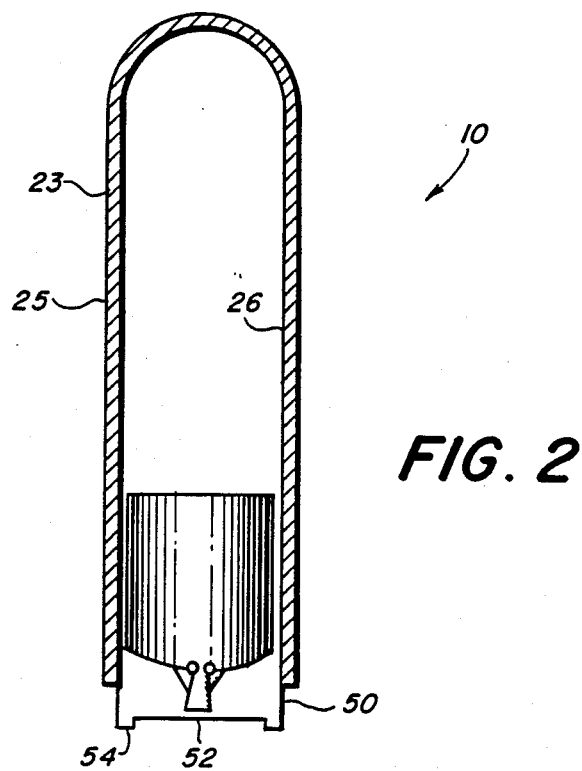
FIG. 2 is a sectional view of a missile that has an internal extender to which a one piece cover is connected, the cover being over the back end of the missile, thus protecting the nozzle system.

FIG. 2 shows an alternate embodiment of the invention. In this embodiment an extender cylinder 50 is inward of the outer surface 25 of the shell 23 of missile 10. That is, extender 50 is connected to the inner surface 26 of missile 10.

Figure 2A:
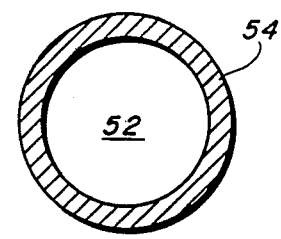
FIG. 2A is a sectional view of a lock ring as a possible means of holding a cover of FIG. 2 onto an internal extender.

A continuous cover 52 is connected to extender 50. The cover 52 can be connected to the extender 50 by means of a lock ring 54, shown in FIG. 2A.

While the present invention has been disclosed in connection with the preferred embodiment thereof, it should be understood that there may be other embodiments which fall within the spirit and scope of the invention as defined by the following claims.

What is claimed is:

1. An underwater launched missile protection system, comprising:
   (a) a missile having a nozzle system in the aft end of the missile; and
   (b) a meltable cover for protecting the nozzle system from energy of turbulent water, the turbulent water being created during underwater launch of the missile, said meltable cover being fixedly attached to the missile.

2. An underwater launched missile protection system, comprising:
   (a) a missile having a nozzle system in the aft end of the missile; and
   (b) a meltable plastic cover for protecting the nozzle system from energy of turbulent water, the turbulent water being created during underwater launch of the missile, the meltable plastic cover being fixedly attached to the missile.

3. An underwater launched missile protection system, comprising:
   (a) a missile having a nozzle in the aft end of the missile;
   (b) a meltable cover for protecting an interior region and an exterior region of the nozzle from energy of turbulent water, the turbulent water being created during underwater launch of the missile; and
   (c) means for fixedly attaching the meltable cover to the missile, the meltable cover being meltable away from the missile due to ignition of a motor of the missile.

* * * * *